US008854921B2

(12) United States Patent
Karl

(10) Patent No.: US 8,854,921 B2
(45) Date of Patent: Oct. 7, 2014

(54) METHOD AND DEVICE FOR ACTIVELY DETECTING OBJECTS IN VIEW OF PREVIOUS DETECTION RESULTS

(75) Inventor: Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 13/514,931

(22) PCT Filed: Nov. 26, 2010

(86) PCT No.: PCT/EP2010/068306
§ 371 (c)(1),
(2), (4) Date: Oct. 22, 2012

(87) PCT Pub. No.: WO2011/082888
PCT Pub. Date: Jul. 14, 2011

(65) Prior Publication Data
US 2013/0033964 A1  Feb. 7, 2013

(30) Foreign Application Priority Data

Dec. 15, 2009 (DE) .......................... 10 2009 054 664

(51) Int. Cl.
*G01S 15/06* (2006.01)
*B60R 16/023* (2006.01)
*G01S 7/527* (2006.01)
*G01S 15/10* (2006.01)
*G01S 15/93* (2006.01)

(52) U.S. Cl.
CPC ........... *B60R 16/0232* (2013.01); *G01S 7/5273* (2013.01); *G01S 15/10* (2013.01); *G01S 15/931* (2013.01)
USPC ........................................... 367/100; 367/98

(58) Field of Classification Search
CPC ... B60R 16/0232; G01S 15/10; G01S 15/931; G01S 7/5273
USPC ..................................................... 367/100, 98
See application file for complete search history.

(56) References Cited

U.S. PATENT DOCUMENTS 3,454,922 A * 7/1969 Dory ............................... 367/98
5,159,837 A   11/1992 Wada
(Continued)

FOREIGN PATENT DOCUMENTS

CN          2204427         8/1995
(Continued)

OTHER PUBLICATIONS

Machine Translation of CN2204427.*
Machine Translation on CN1900737.*
International Search Report for PCT/EP2010/068306, dated Apr. 19, 2011.

*Primary Examiner* — Daniel Pihulic
(74) *Attorney, Agent, or Firm* — Kenyon & Kenyon LLP

(57) ABSTRACT

A method for detecting an object within a surrounding area of a vehicle, includes: repeatedly transmitting wave pulses into the surrounding area; repeatedly receiving wave pulses, which correspond to the transmitted wave pulses reflected by the objects; detecting the object with the aid of a signal representation of the received wave pulses, and ascertaining at least one signal characteristic of a first received wave pulse. The detecting of the object includes: comparing the curve in the form of the signal characteristic of the first received wave pulse to the curve of a further received wave pulse, which was received after the first received wave pulse, location information of the object being corrected in light of the comparison.

10 Claims, 1 Drawing Sheet

(56) References Cited

U.S. PATENT DOCUMENTS

| | | | | |
|---|---|---|---|---|
| 5,260,912 | A * | 11/1993 | Latham | 367/98 |
| 2005/0249035 | A1 * | 11/2005 | Chiappetta et al. | 367/98 |
| 2006/0071764 | A1 | 4/2006 | Lynch | |
| 2013/0033964 | A1 * | 2/2013 | Karl | 367/100 |

FOREIGN PATENT DOCUMENTS

| | | |
|---|---|---|
| CN | 1900737 | 1/2007 |
| DE | 41 03 069 | 8/1991 |
| DE | 10 2006 041 529 | 3/2008 |
| EP | 1 231 481 | 8/2002 |

\* cited by examiner

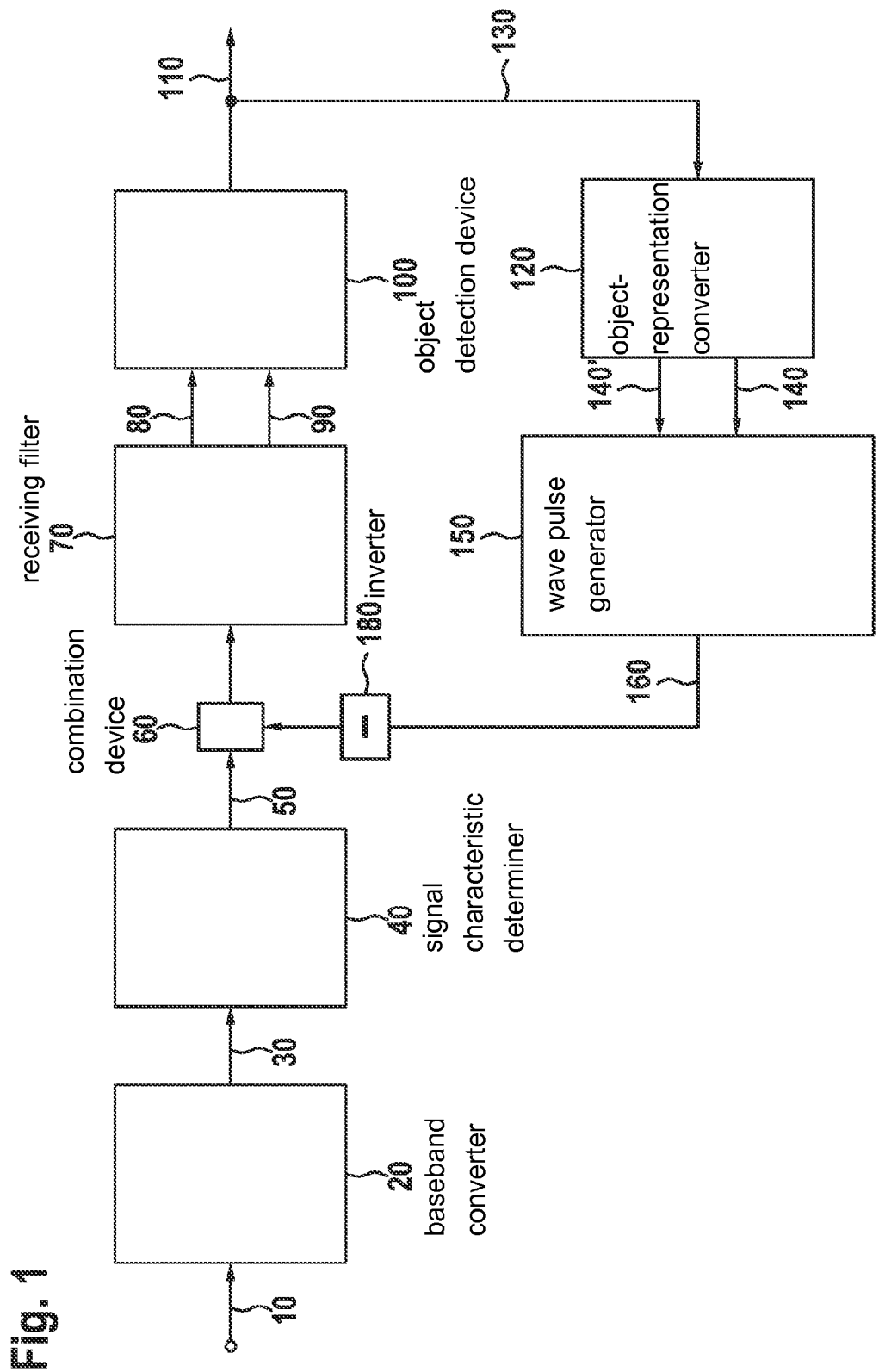

METHOD AND DEVICE FOR ACTIVELY DETECTING OBJECTS IN VIEW OF PREVIOUS DETECTION RESULTS

BACKGROUND OF THE INVENTION

1. Field of the Invention

The present invention relates to object detection devices, e.g., for use in ultrasonic-based object detection systems in the automotive sector.

2. Description of the Related Art

Normally, in driver assistance systems, parking assistance systems and proximity warning systems for motor vehicles, signals are actively transmitted into the surrounding area, in order to be able to detect objects within the surrounding area with the aid of the reflected waves. In addition to microwave-based systems, there are also ultrasonic-based sensors in which a transducer emits sonic waves, the sonic waves reflected from the surrounding area being measured. For example, a range, in which a reflecting object is situated with respect to the transducer, is then deduced in light of the propagation time.

The signal-to-noise ratio is to be regarded as a limiting factor for the performance of the object detection system, in particular, the operating range. However, especially precise processing requires expensive components and, in particular, high-resolution and, therefore, costly signal processing. In order to be able to isolate noise power from the signal line more effectively, parts of the received pulse, which are assumed not to contain a useful signal, are suppressed, for example. One known procedure is to suppress or set to zero a beginning portion of a received pulse, which corresponds to a certain minimum distance, e.g., 10 cm. In this manner, reflection components, which may come from external components of the vehicle itself, are suppressed. A further procedure is to use a threshold value and to suppress the signal, when it is less than the threshold value. Consequently, signal portions that do not contain any useful signal portions are suppressed during echo damping time periods, for example. In this connection, there are methods according to the related art, in which a threshold value predefined as constant is used, which is above a generally assumed noise level, and at or above which the signal is regarded as a signal that contains useful signal portions. However, this procedure for all-inclusive suppression of signal portions, which are regarded as control signals, results in limited performance.

BRIEF SUMMARY OF THE INVENTION

Therefore, an object of the present invention is to provide a method and a device, with the aid of which the performance of locating systems for vehicles may be improved.

The present invention allows useful signals to be distinguished from noise portions in a more selective and, therefore, more efficient manner and consequently produces a better signal-to-noise ratio. Thus, the resulting ranging is more precise and has, in particular, a greater operating range, since greater distances may be covered due to the higher signal-to-noise ratio. The present invention allows the current ranging situation to be taken into account in a more adaptive manner and ensures that noise portions may be suppressed more precisely and to a greater extent, and that signal portions are unintentionally suppressed to a markedly lesser extent.

The selective and adaptive preconditioning of the signals decreases the processing expenditure considerably, but without significantly affecting the quality of the signal processing. In contrast to the related art, the present invention particularly allows changing environmental conditions to be considered in the preprocessing and, therefore, in the general differentiation of noise portions and useful signal portions.

The present invention is based on the concept of deriving, from a first received wave pulse, the extent to which a further received wave pulse contains portions having only noise components. In this connection, a first received wave pulse is used to deduce, from it, the portions at which a following received wave pulse contains noise. In this connection, the first received wave pulse is used in many ways; for one thing, the threshold value, at or above which a useful signal may be assumed, and the noise power, which is to be applied to the further received wave pulse during a useful-signal-free period, may be determined from the signal curve of the first received wave pulse itself. Therefore, the threshold value best suited for the further received wave pulse is estimated with the aid of the first received wave pulse. In this connection, consideration is given to the fact that consecutive received wave pulses have similar signal characteristics and represent a comparable surrounding area. Secondly, the received wave pulse itself is not used, but rather the information carried by it, that is, the curve, which indicates a propagation time of the first received wave pulse. While it should be assumed that a further received wave pulse relates to a similar object situation, the length of the beginning portion of the received wave pulse, in which no echo is registered, may be taken as an estimation of the starting time, while the further received wave pulse may be ignored or suppressed, since no reflection is to be expected there. Therefore, in principle, a signal characteristic from the first received wave pulse is used, in order to use this signal property in the processing of the further received wave pulse. These signal characteristics include, in particular, the signal level during an echo contact phase of the first received wave pulse and, therefore, the noise power, the duration of a beginning portion during which only noise and no signal was detected in the first received wave pulse, or other signal characteristics.

A particular specific embodiment of the present invention provides that the entire curve of the first received wave pulse be used as a signal characteristic and that the further received wave pulse be further processed in such a manner, that it, in the form of its curve, is compared to the curve of the first received wave pulse, and the subtracted curve represents the difference between the first and the further received wave pulses. Using this difference, the object detection itself may be continued differentially, in that, e.g., a delta of the propagation times between the first and the second received wave pulses results in a delta, which is added to a distance of an object or subtracted from this distance. In this manner, in contrast to a repeated remeasurement of the surrounding area, the determined object situation may be corrected recursively or continued, incremented by a delta. The differential analysis, which corresponds to updating and not to repeating the measurement of the surrounding area, may be combined with a repeated remeasurement of the surrounding area.

In general, the object detection of the present invention with the aid of a further received wave pulse is a function of a preceding, first received wave pulse, be it through the correction of the object detection in light of the comparison of the received wave pulse curves, or by deriving a threshold value or a starting time duration from the first received wave pulse, in order to process the further received wave pulse, in particular, by suppressing signal portions, for which only one noise component was determined for the first received wave pulse. The first and the further received wave pulses are preferably delayed by no more than a predetermined period of time with respect to one another, in order to be able to deduce the signal characteristics of the further received wave pulse from signal characteristics of the received wave pulse, or in order to be able to provide a meaningful subtraction.

According to a preferred specific embodiment of the present invention, the further received wave pulse is the direct successor of the first received wave pulse. The first received wave pulse is not to be understood as the first of a series of wave pulses, but only as the wave pulse that was received prior to the further wave pulse. In addition, the further received wave pulse may also be estimated from signal characteristics of several received wave pulses preceding the further received wave pulse. In the case of several first, received wave pulses, e.g., an average value may be calculated, e.g., an average value of a window, or integration over the signal characteristics may take place if an integratable signal characteristic is used for estimating the signal characteristic of the further received wave pulse.

Therefore, the present invention provides a method for detecting an object inside of a surrounding area of a vehicle. In particular, a method for detecting several objects inside of the surrounding area is provided, the objects being able to be stationary or moving objects, which are situated relative to the vehicle. The method relates to the active detection of objects, transmitted wave pulses being repeatedly emitted into the surrounding area. Received wave pulses are (repeatedly) received, the received wave pulses corresponding to the transmitted wave pulses or the transmitted wave pulse, which is/are reflected by the object (or objects). Thus, the received wave pulses correspond to the transmitted wave pulses except for the distortion or delay that is provided by the surrounding area and the objects. Thus, the surrounding area is deduced using the comparison of received wave pulses to transmitted wave pulses.

The object is detected with the aid of a signal representation of the received wave pulses. In this connection, an object may also be detected with the aid of a single received wave pulse. In addition, at least one signal characteristic of the first received wave pulse is ascertained according to the present invention. This signal characteristic may be the curve itself, a propagation time or a distance to an object associated with it, which distance is a signal characteristic of the wave pulse; or the signal characteristic may be provided by a noise power. According to a specific embodiment of the present invention, the curve is regarded as the signal characteristic, the curve of the first received wave pulse being compared to the curve of a further received wave pulse. Consequently, similar signal characteristics of the first and the further received wave pulses are compared to one another. If, in particular, the signal characteristic is the curve of the wave pulse itself, the location information of the object is corrected in light of the comparison. The correction is provided by the location information of the first received wave pulse and by a delta, which results from the comparison between the curves of the first received wave pulse and the further received wave pulse. The delta referring to the location information is combined with the location information, which results from the first received wave pulse. Therefore, the location information is updated using only the comparison result and is initially not directly ascertained only in a new measuring process.

A further specific embodiment provides that a noise power or a propagation time of the first received wave pulse be ascertained as a signal characteristic. The noise power corresponds, for example, to the power, which is produced within an idling time span or an echo damping time period in the first received wave pulse. Thus, the noise power is measured using a signal portion of the first received wave pulse, during which there is essentially no useful signal component. The noise power may be ascertained using the entire portion or using a maximum amplitude inside of the portion, during which there is essentially no useful signal component. A threshold value or a time span for the further received wave pulse may be provided, using this signal characteristic of the first received wave pulse, the signal characteristics corresponding to each other. This correspondence includes, in particular, that the same signal characteristic is not exactly assumed for the further received wave pulse (i.e., noise power or length of portion not having a useful signal component), but the signal characteristic is ascertained with the aid of the first received wave pulse, a safety margin is added, and the threshold value, i.e., the propagation time or time span for the processing of the further received wave pulse, is obtained from the sum.

Consequently, the functional relationship between the propagation time of the further received wave pulse and the signal characteristic of the first received wave pulse may essentially be a correspondence (including a safety margin). For example, the threshold value may decrease with increasing propagation time of the first wave pulse, e.g., proportional to $T^{-x}$, with $x=1 \ldots 2$, T corresponding to the propagation time.

For example, the signal characteristics are the same, if a noise power or useful signal power, from which the threshold value for the further received wave pulse is provided, is ascertained from the first received wave pulse. In the same manner, the signal characteristics are the same if, from the first received wave pulse, a propagation time or a time span is ascertained, with the aid of which a time span or propagation time for the further received wave pulse is provided, during which the signal is suppressed. However, the function may also be a map, in which different signal characteristics are linked to one another. In this connection, a noise power in the form of a threshold value is deduced, for example, in light of the propagation time of the first received wave pulse, or in light of the time span of the first received wave pulse, during which essentially no useful signal component appears. In this case, the function or the map describes an interrelationship, according to which useful power decreases with increasing distance and, consequently, a lower threshold value must be used in the case of long distances than in the case of short distances.

The curve of the wave pulse is regarded as its signal characteristic, the curve of the first received wave pulse being compared to the curve of the further received wave pulse, in order to measure the difference between the two and to use it for correction. The location information of the object is corrected in light of this comparison. Alternatively, a preceding, first received wave pulse is considered, in which a noise power or a propagation time is ascertained as the signal characteristic of the wave pulse. Using the noise power or the propagation time (or a combination thereof, as specified above) of the first received wave pulse, threshold values are derived as a function of this noise power or the propagation time, in the form of a signal characteristic, the curve of the further received wave pulse being discretized according to these threshold values. In particular, the suppressing or ignoring of wave pulse portions, which are below a threshold value or between two threshold values, is regarded as discretizing. In addition, the threshold value may be selected as a function of a useful signal power, the threshold value being acted upon by a negative safety margin, in order to not unintentionally suppress useful signal components that turn out to be smaller.

According to a specific embodiment of this procedure, the curve is regarded as a signal characteristic (that is, the curve of the first wave pulse is compared to the curve of the further wave pulse), and a difference in the time characteristic between the two wave pulses is measured. Furthermore, a signal strength difference between the first and the further received wave pulses may also be measured, and the threshold values may be corrected in accordance with this. The comparing of the curve and the measuring of a signal strength difference may also be combined with one another. In particular, a difference in the propagation times of the first and the further received wave pulses is regarded as a different time characteristic between the two wave pulses, the propagation times being reflected in the length of the time span, which elapses from a time reference point (for example, a virtual transmission time) to the occurrence of a (first) reflection feature. As described above, the signal strength difference may be designated as a difference of maximum signal strength or of a maximum amplitude of the received wave pulses during an echo damping interval. By this means, e.g., the noise power may be considered for the further received wave pulse, or in this manner, the threshold values may be corrected, i.e., updated, on the basis of a noise power of a preceding wave pulse. Consequently, the noise power (and the threshold value of the preceding wave pulse associated with it) are initially assumed for the further wave pulse.

A further specific embodiment provides a simplification of the depiction of information by discretizing the values of the wave pulses. Consequently, when comparing the curve, a discrete-value reproduction of the carrier signal or the baseband signal is used, which represents the specific received wave pulse. The discrete-value reproduction is provided by a number of amplitudes on these steps or a number of threshold values, which is preferably two or three, but may also be greater than three. A representation as a ternary signal is particularly preferred. The discrete-value reproduction of the carrier signal or of the baseband signal, which describes the wave pulse, may correspond to the amplitude curve or may correspond to the first time derivative of the amplitude curve. Thus, the comparison of the signal characteristic of the first and the further received wave pulses is based on either the temporal representation of the curve itself or its first derivative with respect to time. To the extent that they relate to amplitudes, the amplitude resolution steps may be symmetric and be made up of two threshold values or resolution steps symmetric to one another with respect to the origin, or, to the extent that they relate to a signal power, they may be made up of an amplitude resolution step or of two or more amplitude resolution steps. If the amplitude resolution steps have a different magnitude, then these may be linearly distributed along the value axis, the same spacing prevailing between two amplitude resolution steps. As an alternative, to the extent that they are different as far as the magnitude is concerned, the amplitude resolution steps may be logarithmically distributed, in that a subsequent amplitude resolution step is a function of a preceding resolution step by a fixed proportionality factor.

A particularly preferred, specific embodiment provides that the curve is represented as the first derivative of the amplitude curve with respect to time; the discrete-value reproduction being a ternary signal, which indicates if the change in the amplitude curve with regard to magnitude lies below a threshold value (ternary symbol 0), if the slope of the amplitude curve lies above a threshold value (ternary symbol +1), or if the slope is negative and lies below a threshold value (ternary symbol −1). The value discretization may also relate to only curve segments, whose amplitude or power is less than a threshold value, these segments being set back or suppressed during the further processing, segments having amplitudes or powers greater than the threshold value continuing to be represented in essentially a continuous-value manner. A representation that is continuous-value in this sense may be represented, for example, by a discrete-value signal per se, which has, however, a high resolution, e.g., a resolution of 8 Bit or more.

Further specific embodiments of the present invention are focused on the noise power or the propagation time, which is ascertained as a signal characteristic. For example, one of the threshold values corresponds to the noise power. Alternatively, at least one of the threshold values is provided, in which a propagation time is modeled in at least one of these threshold values. This modeling is preferably a monotonically or strictly monotonically decreasing function, which reflects the estimation that in the case of long propagation times, the useful signal power is reduced due to the long distance, and consequently, a lower threshold value is necessary, in order to not unintentionally suppress signal portions, which also contain useful signal components. If a noise power, a useful signal power or a propagation time of the first received wave pulse is used for generating a threshold value for a further received wave pulse, then a predetermined, fixed safety margin is preferably added to the threshold value, for example, 5% or a predetermined value, in order to also be able to suppress outliers in the further received wave pulse, which are not provided in the amplitude in the first received wave pulse. The safety margin may also be negative, in order not to suppress weak, useful signal components in the further received wave pulse, which, with regard to their amplitude or their signal strength, would correspond to a noise component of the first received wave pulse that is to be suppressed.

Furthermore, it is provided that the at least one threshold value be used for selecting portions that only contain noise components, the selecting being provided, in that in portions in which the threshold value is not reached, the further received wave pulse is either set to zero or ignored, as in the case of detecting the objects.

A specific embodiment of the present invention provides that the received wave pulse be measured by an analog-to-digital converter. Analog-to-digital converters (in the following, ADC) normally have a fixed reference signal, with the aid of which the magnitude of the signal in question is estimated and digitized. However, the present invention provides that this reference signal not be constant, but designated by a representation of the first received wave pulse. This reference signal is provided in a representation, in which the further received wave pulse is also applied to the input of the ADC, that is, e.g., as a ternary, discrete-value representation of the amplitude curve or its derivative with respect to time. However, an essentially discrete-value (that is, high-resolution) representation is preferably used, or also an analog signal, which means that no substantial signal processing is necessary prior to the conversion of the ADC. In this manner, the first received wave pulse is already taken into consideration during the conversion of the further received wave signal. Since the reference signal is provided by the first received wave pulse and signals of the further received wave pulse that are to be estimated in comparison with this are provided at the input of the ADC, the signal output by the ADC corresponds to a differential signal curve, which corresponds to the differences between the curve of the further received wave pulse minus the first received wave pulse. This differential approach allows the object detection to be corrected in light of the differential signal, which means that the further received wave pulse is only used as differential updating and not used in order to provide repeated object detection. In this manner, the signal processing is markedly simplified.

The signal representation of the received wave pulses may be a low-pass filtered representation, that is, a low-pass filtered representation of the carrier signal or of a baseband signal.

According to a special, specific embodiment of the present invention, the propagation time of the first received wave pulse is provided for generating the threshold value of the further received wave pulse. This propagation time has a direct correspondence to an object distance over the propagation speed of the wave pulses. If the propagation time (and consequently a distance value, as well) of the first received wave pulse is used for the threshold value determination, then the propagation time or the distance may be provided in discrete-value form, the resolution of the discrete-value representation being a function of the propagation wavelength. Consequently, resolution steps, whose height or whose spacing from each other corresponds to a wavelength or a half wavelength of the wave pulse in the surrounding area, are used for the resolution. In addition, a multiple of the half or the entire wavelength may be used as a height for the resolution steps.

The method is generally suitable for wave pulses in the surrounding area, which are provided as electromagnetic wave pulses or as sonic waves. However, the present invention is preferably used for ultrasonics, so that all of the wave pulses in the surrounding area are represented as ultrasonic wave pulses.

A device for detecting objects according to the present invention is provided, in order to implement the method of the present invention. Such a device includes a signal processing device having a memory, as well an input. The input receives the signal representation (for example, the analog converter signals) of the first and further received wave pulses and transmits these to the signal processing device. Since the present invention generally provides for the further received wave pulse to be processed on the basis of at least one characteristic of the first received wave pulse, the signal processing device is configured to store the signal representation, in particular, in the memory. Depending on the embodiment, the signal processing device further includes a curve comparator, which compares the curve of the first received wave pulse (stored in the memory) to the curve of the further received wave pulse (applied via the input and optionally stored in a buffer memory). The signal processing device is further provided for initially estimating the location information of the object in light of the first received wave pulse and correcting this location information in accordance with the result of the curve comparison, in order to consequently be able to correct the location information of the at least one object in light of the further received wave pulse. A further development of the device provides that the signal processing device further include a threshold value generator and a threshold value comparator; the threshold value generator providing a threshold value, using a signal characteristic of the first received wave pulse. The signal processing device is optionally set up to add a safety margin to the result, in order to deliver the sum of the threshold value or the noise power and the safety margin to the threshold value comparator, which is configured, in turn, to compare the further received wave pulse to this. In this manner, the signal processing device is able to suppress values of the further received wave pulse below the threshold value (and therefore exclude them from the further processing of the signal information) or to set the values zero, which means that the further processing is made easier.

One specific embodiment of the device according to the present invention provides that the signal processing device be configured to measure the propagation time of the nearest object with the aid of the first received wave pulse (for example, using a timer or counter, in combination with a device, which can detect the first reflection in the first received wave pulse). In this connection, the signal processing device is set up to suppress values of the further received wave pulse, which correspond to a propagation time shorter than the propagation time of the nearest object. Consequently, the signal processing device is configured to ignore, set to zero, or suppress portions of the received wave pulse, which are in a beginning portion that corresponds to a distance, for which no reflection was detected in the first received wave pulse. Therefore, for the further received wave pulse, a signal portion, from which it is to be assumed, in light of the first received wave pulse, that only noise components are present there, is suppressed by the signal processing device. In particular, the length of the beginning portion, for which the further received wave pulse is suppressed, may correspond to the propagation time minus a propagation time safety margin, which means that in the case of a relative movement of the object towards the vehicle, this, for the further received wave pulse, still lies in a portion, which does not belong to the beginning portion and is suppressed.

A further specific embodiment provides that the signal processing device suppress, in particular, a short, first beginning portion of the further received wave pulse, which lies in a predefined, short propagation time that corresponds, in turn, to a distance of, e.g., 5 or 10 cm, within which reflections by vehicle components themselves can still occur. The signal processing device may be set up to suppress both portions, that is, first of all, at least the short, beginning portion for suppressing reflections by the vehicle itself, and secondly, the propagation time portion of the first received wave pulse in which no reflection occurs. In order to also be able to detect objects suddenly appearing, which are generally not detected in the first, but by the further received wave pulse, this propagation-time-specific suppression may also be provided for only a part of the received wave pulses, which means that, for example, every tenth received wave pulse does not have a first, suppressed, beginning portion, which results from the propagation time of the first received wave pulse, in order to be able to detect the nearest objects that appear so rapidly, and not to generally suppress them in light of the propagation time of a preceding, first received wave pulse.

Instead of ascertaining the threshold value with the aid of the noise power of the first received wave pulse, the threshold values, which are valid for the further received wave pulse, may also be derived from the signal strength of an object echo of the first received wave pulse; the threshold value increasing with increasing signal strength (for example, measured in light of a maximum amplitude of an envelope), but lying below the signal strength, in order to not suppress subsequent useful signals having the same (or a similar) strength.

In general, the first received wave pulse and the further received wave pulse must not be received by the same sensor, but the first and the further received wave pulses may be received by different transducers or sensors.

A signal characteristic of a first received wave pulse may also consist in the received echoes or their times of occurrence; a local object distribution being able to be initially provided from the first received wave pulse; the time period(s) for the further received wave pulse, in which a reflection is to be expected, and which are therefore not to be suppressed, in contrast to the remaining portions of the further received wave pulse, being derived, in turn, from the local object distribution with the aid of a predictor. In this manner, a "template" for the further signal detection, that is, for the detection with the aid of the further received wave pulse, is generated from an acquired object image; the template reducing the signal processing to the estimated, relevant ranges and suppressing ranges, which were regarded as not relevant for the object detection in light of the first wave pulse, for the further received wave pulse. Therefore, according to one approach, a "matched filter," in accordance with which the further received wave pulse is filtered, is generated from the first received wave pulse. This "matched filter" describes the positions, which were considered relevant in light of the first received wave pulse, as well as the portions of the pulse, which were considered not relevant in light of the first received wave pulse. The information of the first received wave pulse may also be cumulated in a "matched filter," which is corrected or updated with each further received wave pulse. The "matched filter" provides that the differences between the first and the further received wave pulses be substantially detected and processed further, in particular, by feedback to an input of a closed loop, which also includes the further received wave pulse. At this input, the differential analysis (that is, the difference between the first and the further received wave pulses) and the further received wave pulse are combined, in order to, e.g., correct or update the representation of the object positioning (for example, represented by a typical, current reflection pulse curve) in accordance with a fed-back feedback loop.

BRIEF DESCRIPTION OF THE DRAWINGS

FIG. 1 shows a diagram for explaining the method of the present invention and the device of the present invention in further detail.

DETAILED DESCRIPTION OF THE INVENTION

In the diagram of FIG. 1, it is initially provided that received wave pulses be applied to a baseband converter 20 as an input signal in the form of a carrier signal 10. The baseband converter forms a baseband signal 30 from the carrier frequency signal, the baseband signal optionally being sampled already in digital form. The baseband signal is transmitted to a signal characteristic determiner 40, which, in the case of FIG. 1, determines and outputs echo intensity 50. This is delivered to a combination device 60, which is defined below in more detail and transmits echo intensity signal 50 (combined with a further signal) to a receiving filter 70. From echo intensity signal 50, which was combined with a further signal, this receiving filter ascertains further signal characteristics, which are object-specific, that is, an echo propagation time signal 80 and a corresponding echo amplitude signal 90. The combination of the echo propagation time signal with the echo amplitude signal describes the objects in light of the corresponding reflection components, the reflection components being defined by their time of occurrence and their amplitude level. Using this combination, the detected objects themselves are also defined, for example, in the form of a signal curve. An object detection device 100 evaluates signals 80, 90 and generates an object representation 110 from them. This may be represented, for example, in polar or cartesian coordinates, the object positioning representation 110 being used for further processing or representation on the windshield or a display. While echo propagation times 80 are reflected in representation 110 in light of object distances to the vehicle, echo amplitude signal 90 is conveyed in representation 110, in that the reflecting object itself is further specified, for example, using the magnitude or another object parameter, which is a function of the amplitude of the real amplitude signal.

Object positioning representation 110 is preferably present in digital form and, according to the present invention, is initially fed back, in a feedback loop, to an inverse object-representation converter 120 via a feedback loop 130; inverse object-representation converter 120 generating estimated amplitude echo signals 140 and echo propagation time signals 140' with the aid of object positioning representation 110, which is applied to inverse converter 120 via feedback loop 130. Consequently, starting out from object positioning representation 110, the inverse object-representation converter generates an estimated echo propagation time signal 130 and an estimated amplitude echo signal 140. The estimated echo propagation times 140' and amplitudes 140 generated by inverse object-representation converter 120 from the object positioning representation are supplied to a reference wave pulse generator 150, which generates a reference wave pulse signal 160 from signals 140, 140'. Thus, the reference wave pulse signal represents a (estimated or extrapolated) received wave pulse, which would be formed if objects according to object positioning representation 110 would be present in the surrounding area. Consequently, feedback loop 130 starts out from the already-generated, object positioning representation 110.

Alternatively, this may also start out from a temporarily stored, buffered or delayed baseband signal, which represents the first received wave pulse, and which is compared or combined with a representation of the further received wave pulse by combination device 60. In this manner, the feedback loop may be shortened.

The diagram shown in FIG. 1 further includes a symbolically represented inverter 180, which reverses the reference wave pulse signal. The reversed signal is supplied to combination device 60, in order to combine it with the baseband signal of a further received wave pulse, while the reference wave pulse signal represents a preceding, first received wave pulse in light of the object positioning representation. Inversion 180 and combination 60 are only symbolically represented in FIG. 1; the two together stand for a comparison between a first and a further received wave pulse (or their base signals); the feedback loop and, in particular, combination device 60 representing the updating of the first wave pulse, using the quotient of the first and further wave pulses.

In one simplified specific embodiment according to the alternative represented, the generation of the object positioning representation and its reconversion does not take place inside the feedback loop, but outside of it. Therefore, only signal representations or curve representations of the wave pulses are used inside of the loop, a controlled variable in the form of a wave pulse being corrected in accordance with the feedback, in light of the difference between the wave pulses.

In the flowchart of FIG. 1, a delay takes place inside of the feedback loop, for example, due to object representation generator 100 or due to corresponding inverse converter 120, which means that combination device 60, together with inverter 180, combines a first wave pulse with a further wave pulse. In this manner, the system is corrected over time.

What is claimed is:
1. A method for detecting an object within a surrounding area of a vehicle, comprising:
repeatedly transmitting wave pulses into the surrounding area;
repeatedly receiving wave pulses which are the transmitted wave pulses reflected by the object;
detecting the object with the aid of a signal representation of the received wave pulses, wherein the detecting of the object includes:

ascertaining at least one signal characteristic of a first received wave pulse; and one of (i) comparing a curve of the signal characteristic of the first received wave pulse to a curve of a signal characteristic of a further received wave pulse received after the first received wave pulse, location information of the object being corrected based on the comparison, or (ii) ascertaining one of a noise power or a propagation time as the signal characteristic of the first received wave pulse, providing threshold values as a function of the one of the noise power or the propagation time, and discretizing the curve of the further received wave pulse in accordance with the threshold values.

2. The method as recited in claim 1, wherein:

the curve of the first received wave pulse is compared to the curve of the further received wave pulse;

at least one of (i) a difference in the time characteristic between the first received wave pulse and the further received wave pulse, and (ii) a difference in signal strength between the first received wave pulse and the further received wave pulse is measured; and the difference in the time characteristic represents a difference in the propagation times of the first received wave pulse and the further received wave pulse, and the difference in signal strength represents one of a difference in maximum signal strength between the first received wave pulse and the further received wave pulse or a difference in the signal strengths between the first received wave pulse and the further received wave pulse during a respective echo damping time period of each of the first received wave pulse and the further received wave pulse.

3. The method as recited in claim 1, wherein:

in the comparing of the curves, for each of the curve of the signal characteristic of the first received wave pulse and the curve of the signal characteristic of the further received wave pulse, one of (i) a discrete-value reproduction of a continuous-value amplitude curve of a carrier signal or of a baseband signal which represents the respective received wave pulse is used, or (ii) a discrete-value reproduction of the first time derivative of the amplitude curve of the carrier signal or of the baseband signal which represents the respective received wave pulse is used;

each of the discrete-value reproductions has amplitude resolution steps which correspond to the threshold values; and the amplitude resolution steps are one of linearly or logarithmically distributed.

4. The method as recited in claim 3, wherein the number of one of amplitude resolution steps or threshold values is at least three, and each of the curves is provided as a ternary signal.

5. The method as recited in claim 1, wherein:

one of the noise power or the propagation time is ascertained as the signal characteristic of the first received wave pulse;

one of (i) at least one of the threshold values corresponds to the noise power during an echo damping time period, or (ii) a predefined mapping of propagation times onto the threshold values is provided such that, starting out from a propagation time of the first received wave pulse, at least one of the threshold values takes precedence; and values of the signal representation of the further received wave pulse which are less than the at least one of the threshold values are not considered during the detection of the object.

6. The method as recited in claim 1, wherein:

the signal representation of the further received wave pulse is provided by an analog-to-digital converter;

a reference signal of the analog-to-digital converter is provided by a representation of the first received wave pulse such that the first received wave pulse is taken into account during the analog-to-digital conversion of the further received wave pulse; and the analog-to-digital converter outputs an output signal which corresponds to a representation of the further received wave pulse relative to the first received wave pulse.

7. The method as recited in claim 1, wherein the object is detected in light of the signal representation of the further received wave pulse, and wherein the signal representation is a low-pass filtered representation of one of a carrier signal or a baseband signal, which represents the further received wave pulse.

8. The method as recited in claim 1, wherein the transmitted wave pulses are emitted into the surrounding area as ultrasonic waves, and the received wave pulses are reflected ultrasonic waves received from the surrounding area.

9. A signal processing device for detecting an object within a surrounding area of a vehicle based on repeatedly transmitted wave pulses into the surrounding area, the device comprising:

an input which is configured to receive signal representations of received wave pulses which are the transmitted wave pulses reflected by the object;

a memory configured to store the signal representation of at least a first received wave pulse; and one of: (i) a curve comparator configured to compare a curve of the signal representation of the first received wave pulse to a curve of a signal representation of a further received wave pulse received after the first received wave pulse, and the signal processing device being configured to correct location information of the object based on the result of the curve comparison; or (ii) a threshold value generator and a threshold value comparator connected to one another, the threshold value generator being configured to generate a threshold value which corresponds to the noise power of the first received wave pulse during an echo damping time period of the first received wave pulse, and the threshold value comparator being configured to compare the threshold value to the curve of the further received wave pulse such that values of the further received wave pulse which fall below the threshold value are not considered in detecting the object.

10. The signal processing device as recited in claim 9, wherein the signal processing device is configured to:

measure the propagation time of the nearest object with the aid of the first received wave pulse; and suppress values of the further received wave pulse which correspond to a propagation time shorter than a reference time defined by the propagation time of the nearest object minus a propagation time safety margin.

* * * * *